United States Patent Office 2,803,660
Patented Aug. 20, 1957

2,803,660
CYCLOPENTANONE COMPOUND

John D. Garber, Cranford, N. J., assignor to Merck & Co., Inc., Rahway, N. J., a corporation of New Jersey No Drawing. Application December 24, 1954,
Serial No. 477,600

1 Claim. (Cl. 260—590)

This invention is concerned with 2,5-bis-(3-methoxy-4-hydroxybenzyl) cyclopentanone and processes of preparing the same.

In accordance with the present invention, I have discovered that 2,5-bis-(3-methoxy-4-hydroxybenzyl) cyclopentanone, which can be represented by the structural formula

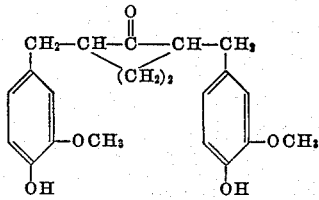

is obtained when 2,5-divanillalcyclopentanone is reacted with hydrogen in the presence of a hydrogenation catalyst. This compound is useful in the field of chemistry. In particular, it is a useful antioxidant which may be utilized in oils, fats, and other materials for the prevention of oxidative deterioration.

I have found that 2,5-bis-(3-methoxy-4-hydroxybenzyl) cyclopentanone is conveniently produced by intimately contacting 2,5-divanillalcyclopentanone with hydrogen in the presence of a noble metal catalyst. Generally, I find it advantageous to carry out this reaction in an inert solvent for the starting material such as dioxane, ethanol, methanol, and the like. The hydrogenation proceeds readily at room temperature and I therefore prefer to carry it out at this temperature, although higher or lower temperatures can also be employed. The reaction can be effected at atmospheric pressure or superatmospheric pressure, but I prefer to use low pressures since this avoids the need to use expensive high pressure reactors.

After the hydrogenation is complete, the desired product is readily recovered by removing the catalyst and evaporating the resulting solution to dryness. The product so obtained can then be further purified, if desired, by recrystallization from suitable solvents such as aqueous ethanol.

The starting material, 2,5-divanillalcyclopentanone, which can be represented by the structural formula

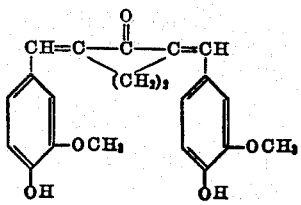

can be readily prepared by the reaction of vanillin with cyclopentanone in the presence of hydrochloric acid in accordance with methods known in the art.

When 2,5-bis-(3-methoxy-4-hydroxybenzyl) cyclopentanone was tested for antioxidant activity by adding 1 mg. of the compound dissolved in about 1 ml. of ethanol to 10 g. of lard, it was found to significantly retard the formation of peroxides. In addition, it was found that wafers prepared from flour and lard to which 2,5-bis-(3-methoxy-4-hydroxybenzyl) cyclopentanone was added at the level of 1 mg. per 10 gms. of lard were protected against olfactometric rancidity considerably longer than wafers prepared with pure lard.

The example which follows illustrates the method of preparing my new compound.

Example

A solution of 7.04 g. (0.02) mole of 2,5-divanillalcyclopentanone in 600 ml. of dioxane was hydrogenated at about 42 p. s. i. g. using 0.2 g. of platinum oxide. About two moles of hydrogen per mole of starting compound were absorbed. The reaction mixture was filtered to remove the catalyst. The resulting filtrate was concentrated by distillation under reduced pressure and evaporated to dryness on a steam bath to yield about 6.9 g. of greenish-yellow tacky solid. After several recrystallizations from aqueous ethanol, 2,5-bis-(3-methoxy-4-hydroxybenzyl) cyclopentanone in the form of white crystals melting at 115–116.5° C. was obtained.

*Analysis.*—Calculated for the saturated ketone $C_{21}H_{24}O_5$: C, 70.77%; H, 6.79%. Found: C, 70.55%; H, 6.39%.

The product gave a positive test with 2,4-dinitrophenylhydrazine.

The 2,5-divanillalcyclopentanone employed as the starting material in the foregoing example may be prepared in accordance with the procedures described by Samdahl and Samdahl and Hanson (Chemical Abstracts 22, 3145, and 28, 5424 respectively). In accordance with the described procedures, vanillin was fused by heating on a steam bath and mixed with cyclopentanone. After adding a small quantity of concentrated hydrochloric acid, the reaction mixture was allowed to stand overnight at room temperature. It was then washed with water, and the resulting product recrystallized from benzene. The 2,5-divanillalcyclopentanone was obtained in the form of brown crystals melting at 213–216° C.

Various changes and modifications in the procedures herein disclosed will occur to those skilled in the art, and to the extent that such changes and modifications are embraced by the appended claim, it is to be understood that they constitute part of my invention.

I claim:

2,5-bis (3-methoxy-4-hydroxybenzyl) cyclopentanone.

References Cited in the file of this patent

Chem. Abs., vol. 22, p. 3145 (Samdahl) 1928.
Chem. Abs., vol. 28, p. 5424 (Samdahl et al.) 1934.